United States Patent [19]
Horn

[11] Patent Number: 5,938,767
[45] Date of Patent: Aug. 17, 1999

[54] ELECTRONIC INFORMATION LOCKOUT SYSTEM

[76] Inventor: Douglas Horn, 6720 Wickliff Trail, Plano, Tex. 75023

[21] Appl. No.: 08/868,910

[22] Filed: Jun. 4, 1997

Related U.S. Application Data

[63] Continuation-in-part of application No. 08/699,622, Aug. 19, 1996, Pat. No. 5,661,786.

[51] Int. Cl.[6] .................................................. G06F 12/14
[52] U.S. Cl. .......................... 713/200; 713/201; 713/202; 710/101; 710/108
[58] Field of Search ......................... 395/187.01, 188.01, 395/712, 281, 829, 288, 186; 379/441, 443–5, 93.11; 711/167; 380/4; 361/68.6; 705/410; 713/200, 201, 202; 710/101, 108

[56] References Cited

U.S. PATENT DOCUMENTS

| | | | |
|---|---|---|---|
| 4,311,883 | 1/1982 | Kidney | 379/443 |
| 4,446,708 | 5/1984 | Ely | 379/445 |
| 4,518,823 | 5/1985 | Kessler | 379/93.28 |
| 4,584,856 | 4/1986 | Petersdorff et al. | 70/57 |
| 4,679,226 | 7/1987 | Muehleisen et al. | 379/93.02 |
| 4,694,492 | 9/1987 | Wirstrom et al. | 380/23 |
| 4,763,351 | 8/1988 | Lipscher et al. | 379/93.02 |
| 4,812,994 | 3/1989 | Taylor et al. | 705/410 |
| 4,879,645 | 11/1989 | Tamada et al. | 235/380 |
| 4,901,068 | 2/1990 | Benton et al. | 340/825.31 |
| 4,907,268 | 3/1990 | Bosen et al. | 380/4 |
| 5,018,190 | 5/1991 | Walker et al. | 379/93.02 |
| 5,050,041 | 9/1991 | Shafi | 361/686 |
| 5,148,534 | 9/1992 | Comerford | 771/164 |
| 5,250,767 | 10/1993 | Sammon | 200/43.08 |
| 5,280,581 | 1/1994 | Bathrick et al. | 395/200.47 |
| 5,341,510 | 8/1994 | Gillett, Jr. et al. | 395/800 |
| 5,355,507 | 10/1994 | Nishikawa | 395/829 |
| 5,361,296 | 11/1994 | Reyes et al. | 379/93.11 |
| 5,388,211 | 2/1995 | Hornbuckle | 395/712 |
| 5,402,492 | 3/1995 | Goodman et al. | 380/25 |
| 5,440,619 | 8/1995 | Cann | 379/93.11 |
| 5,448,630 | 9/1995 | Barstow | 379/199 |
| 5,455,921 | 10/1995 | DeFilipps et al. | 711/167 |
| 5,485,570 | 1/1996 | Busboom et al. | 395/161 |
| 5,506,990 | 4/1996 | Holman, Jr. | 395/750 |
| 5,537,544 | 7/1996 | Morisawa et al. | 395/188.01 |
| 5,774,058 | 6/1998 | Henry et al. | 340/825.31 |
| 5,774,543 | 6/1998 | Flowers | 379/441 |
| 5,836,010 | 11/1998 | Kim | 395/186 |

FOREIGN PATENT DOCUMENTS 2231240  11/1990  United Kingdom .

OTHER PUBLICATIONS

Rockwell Semiconductor Systems Data Sheet for RCV336ACFL/SP Integrated AudioSpan Speakerphone, Data/Fax Modem Device Set for Portable Applications, MD160, Rev. 1, Aug. 2, 1996.

Rockwell Semiconductor Systems Data Sheet for RCV288ACL/Integrated DSVD Modem Device Set for Portable Applications, MD161, Feb. 15, 1996.

*Primary Examiner*—Dennis M. Butler
*Assistant Examiner*—Rijue Mai
*Attorney, Agent, or Firm*—Wood, Herron & Evans, LLP

[57] ABSTRACT

A lockout system for preventing children from accessing parentally-restricted and undesirable material with a computer comprises a controller unit for receiving commands from a computer and generating control codes to a data device to transmit electronic information over a phone line. A locking device is operably coupled to the controller unit and has a LOCKED state and an UNLOCKED state. The controller unit is further operable for determining the state of said locking device and preventing the transmission of electronic information from said data device when the locking device is in a LOCKED state. Other embodiments utilize a locking device to disable a relay in-line with the telephone line of a modem or to interrupt the phone line directly.

6 Claims, 2 Drawing Sheets

ELECTRONIC INFORMATION LOCKOUT SYSTEM

RELATED APPLICATION

This is a continuation-in-part application of application Ser. No. 08/699,622, entitled "Electronic Information Lockout Device," filed on Aug. 19, 1996, now U.S. Pat. No. 5,661,786, which application is incorporated herein by reference in its entirety.

FIELD OF THE INVENTION

This invention relates generally to a system and method for preventing children from accessing parentally-restricted electronic information through their computers, and is specifically related to preventing children from accessing pornography and other undesirable information over the Internet.

BACKGROUND OF THE INVENTION

With the relatively recent advent of widespread access to on-line computer information and services, collectively referred to as the Internet, computer users are able to obtain a wide variety of information which is delivered directly into their homes. All that is necessary to access the Internet is a computer with modem or interfacing capability, a telephone line, and a telephone port or jack.

To meet the demand for Internet information, there has also been a proliferation of Internet services and access software packages which allow a user to move through or browse the available on-line options. This has made it very easy for users to obtain the information they need. Internet users are not only adults, but children as well, and ironically, children, as a class, are probably more computer literate than many adults due to the great amount of exposure to computers that children now receive at an early age. The user-friendly atmosphere of the Internet allows children with even minimal computer skills to access information at defined "sites" which are related to a particular topic. Other electronic sites, such as bulletin boards, may also be accessed with a computer having modem capabilities.

Unfortunately, not all information sites contain material which is suitable for children. Pornographic material, for example, is abundant on the Internet, and children can access and view pornographic pictures much the same way that they might view pictures in a pornographic magazine. While access to magazines and other printed materials is limited to adults, access to Internet pornography is not so limited. As may be appreciated child access to pornography through the Internet is an alarming concern for parents and other adults, such as educators, who do not want their own children or children in their care exposed to pornography.

Additionally, pornographic materials and sites are not the only informational avenues to which parents and other adults would like to restrict their children's access. The Internet also provides access to information regarding body piercing, child pornography, violent topics, and other similar information which would be detrimental to the proper mental and physical development of a child. Seemingly innocuous chat groups on the Internet may also expose a child to harmful adult topics. Chat groups are not only mentally dangerous to children but also physically dangerous, as evidenced by a recent incident wherein a child was abducted by a pedophile who he met and talked with over the Internet.

Therefore, parents and other adults have a substantial interest in preventing children from accessing the Internet through their computers. This is becoming ever more difficult, since personal and home computers are very popular and are becoming more widespread, much the same way that television did in the 1950's and 1960's. Parents' frustrations are further exacerbated by the fact that personal computers are usually placed in a home office, bedroom, or other designated room and are not readily visible to a supervising adult. A child may be accessing parentally-restricted information right under the nose of a parent.

While censorship efforts have been made to prevent certain categories of materials from appearing on or being accessible through the Internet, they have been generally unsuccessful. Despite the possible harm to children from these materials, First Amendment arguments and concerns have prevented the removal of the above-discussed material from the Internet. Furthermore, since adults and children share the same access to such materials, widespread database prevention for children at the source will inevitably prevent adults access to information which arguably should be available to them. Therefore, parents and other adults are left with the task of preventing children from accessing certain Internet materials.

Furthermore, not only are parents and adults interested in preventing Internet access to potentially damaging and harmful materials, but they are also interested in preventing any additional Internet access at all. Since Internet access can cost money, an unsupervised child may run up large amounts of costs playing around on the Internet. Internet shopping is also a concern, as companies offer numerous products for sale over the Internet which require only a credit card number. In the case of some on-line services, they may already have the parent's credit card number and all that a child has to do is make the order. Not a few parents have been unpleasantly surprised by large telephone or credit card bills directly related to their child's access to the Internet. Finally, a parent may simply be interested in preventing a child from spending too much time on the computer to the detriment of their school work or other activities, such as sports.

A simple solution to preventing a child's access to the Internet would be to remove the computer and lock it away until a child may be supervised by an adult. Such a solution is not only impractical, but it is also inconvenient. Computers are usually bulky and heavy and are not easy to move around. Furthermore, the various peripherals such as printers, monitors and phone line connections will constantly have to be disconnected and then reconnected each time that the computer is to be used. Still further, removing the computer prevents adult use and non-Internet use. Computers are very useful tools and are used by adults and children alike for a number of constructive tasks such as accounting, document generation and homework. Locking the computer away prevents such constructive use. Even when the computer is to be constructively used, such as by a child for homework, most parents do not want to have to stand behind the child or even stay in the same room to prevent Internet access altogether or to prevent access to undesirable or adult materials.

Efforts have been made to prevent Internet access while leaving the computer in a usable condition or mode, as evidenced by co-pending U.S. application, Ser. No. 08/699,622. While such efforts are successful as an economical way in which to prevent Internet access without disabling the entire computer, they also prevent use of other desirable modem functions, such as fax capabilities and voice/message capabilities.

Therefore, it is an objective of the present invention to assist parents and other adults in preventing a child's exposure to harmful and undesirable information available on the Internet.

It is another objective of the invention to restrict unsupervised access to the Internet to reduce the monetary costs associated therewith.

It is still another objective to provide to an adult such restrictive measures without substantial modification to or removal of a computer to allow constructive use of a computer by a child.

It is another objective to restrict Internet access while leaving incoming fax and voice capabilities of the computer intact.

It is another objective to provide assistance to adults in a relatively inexpensive and easily understood manner so that restrictive measures may be implemented without substantial financial or time expenditures by an adult.

It is still another objective to restrict a child's access to the Internet in a way which is not easily or readily overcome or bypassed by the child.

It is another objective to provide a parent the ability to restrict Internet access without knowing how to use a computer.

SUMMARY OF THE INVENTION

The above objectives and other objectives are met by the system of the present invention which prevents children from accessing parentally-restricted and undesirable electronic information through an interface device of a computer, such as a traditional modem card, and ISDN modem, a cable modem, or a dedicated Network card. The lockout system prevents exposure to undesirable information while maintaining the operational integrity of the computer so that it may be used for constructive purposes. Furthermore, the invention prevents Internet data access while leaving all incoming voice and fax capabilities of the computer and modem circuitry intact. The lockout system is not easily or readily bypassed by a child and provides a parent or other adult the ability to restrict Internet access without themselves intimately knowing how to use a computer.

More specifically, in one embodiment of the invention, the invention includes a locking device operably coupled to the controller unit of modem circuitry utilized by the computer. The modem circuitry might be a standalone modem, or could be a modem card internally coupled to the computer. The locking device provides a status signal, when activated, which is read by the controller unit upon the receipt of a dialing command by the controller unit from the computer. The dialing command indicates that the computer user is trying to access the Internet. Preferably, the locking device includes a lock switch, which may be easily locked and unlocked by an adult without using the computer. Upon reading the locking device signal, the state of the lock switch is determined by the controller unit.

The controller unit of the modem circuitry will generally be coupled to additional modem transmission circuitry, such as data pump circuitry, for providing the necessary data, fax and voice capabilities of the modem circuitry. If the state or status of the locking device, and specifically the lock switch, is that the device is locked, then the controller unit prevents the transmission of the necessary dialing commands to the data pump circuitry. The controller unit instead is operable to send an error message or other message to the computer screen that the Internet access device is locked and the Internet cannot be accessed.

Since the controller unit is operable for distinguishing the dialing command from other input/output commands, the invention is able to selectively prevent Internet access without preventing the incoming fax and voice capabilities of the modem circuitry. In that way, the invention does not prevent other constructive uses of the computer. Preferably, the locking device, such as a lock switch, is coupled to the front of the computer and is readily accessible and operable for a person without having to turn on and use the computer.

In another embodiment of the invention, a locking device is coupled between the controller unit and an output relay of the modem circuitry. The controller unit operates a variety of relays in the telephone interface circuitry coupled to the data pump circuitry within a modem device. One of the relays is coupled in-line with the telephone line. The locking device is then coupled between the controller unit and the relay in the relay control line from the controller unit. When the locking device is in the locked state, the controller unit is effectively prevented from closing the relay to allow transmission of data, such as for Internet access. Therefore, Internet access is prevented. The relay is also disabled for voice and fax communications. Therefore, in this embodiment of the invention, the modem is effectively completely disabled.

In accordance with another embodiment of the invention, a locking device is coupled between the modem data pump circuitry and the external connection to the outside telephone line. The telephone signal is then routed through the locking device. When the locking device, such as a lock switch, is in a locked state, transmission of data to the telephone line is prevented. Similarly to the embodiment discussed directly above, this embodiment is effective to disable the entire modem, including fax and voice capabilities.

BRIEF DESCRIPTION OF THE DRAWINGS

The accompanying drawings, which are incorporated in and constitute a part of this specification, illustrate embodiments of the invention and, together with a general description of the invention given below, serve to explain the principles of the invention.

DETAILED DESCRIPTION OF THE INVENTION

Figure 1:
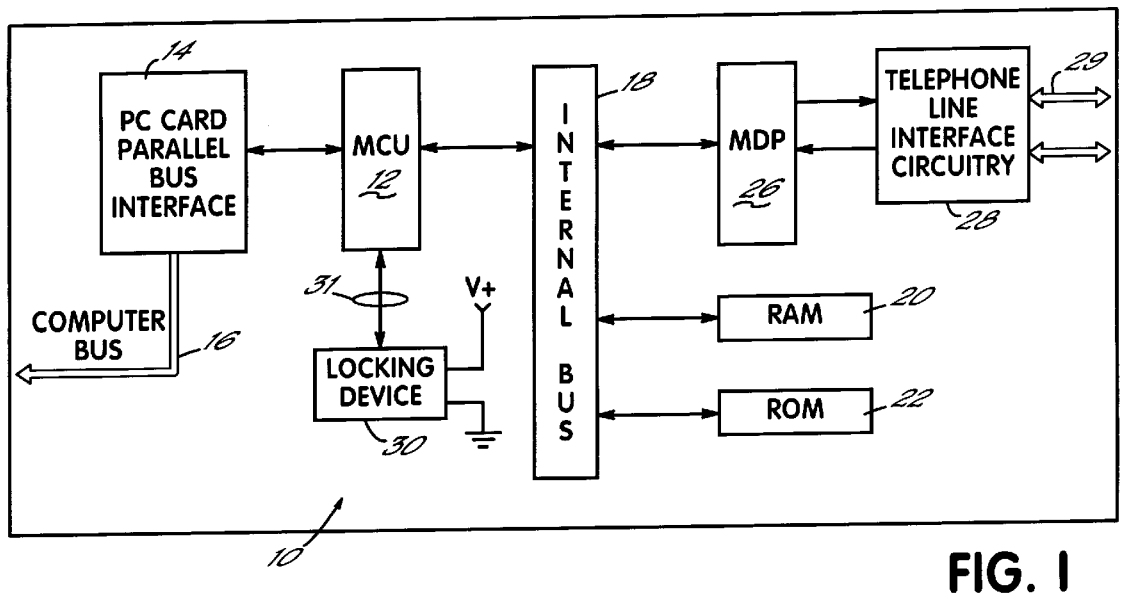
FIG. 1 is a block schematic diagram of one embodiment of the present invention.

FIG. 1 illustrates, in block diagram form, one embodiment of the present invention in which a locking device is operably coupled to the controller unit of modem circuitry for preventing Internet access. Specifically, the modem circuitry of system 10 includes a controller unit or microcontroller unit (MCU) 12 which is operable for controlling the various features of the modem system 10, such as the transmission and receipt of data, the transmission and receipt of facsimiles, and the transmission and receipt of voice messages. Modem system 10 may be a personal computer (PC) modem card which is connected internally in the computer, or may be found in a stand-alone modem which is operably coupled to the computer.

Controller unit 12 is operably coupled to appropriate bus interface circuitry 14, such as on a PC card, and ultimately to the computer bus 16 for interfacing with the computer. Controller unit 12 receives commands from the computer for determining what input/output capabilities are desired through modem system 10. Controller unit 12 is also coupled to an internal modem bus 18 for accessing support RAM 20 and support ROM 22 which contain control code software. Internal bus 18 also interfaces the controller unit 12 with modem transmission circuitry or a data device such as the modem data pump (MDP) 26. Data pump 26, in turn, interfaces with telephone line interface circuitry 28, transmitting and receiving electronic information such as for data, facsimile, and voice capabilities. The telephone line interface circuitry 28 is coupled to one or more appropriate telephone lines 29. The controller unit is preferably a microprocessor or microcomputer. One suitable controller unit is an L39 or P39 microcomputer available from Rockwell Semiconductor Systems. One suitable data pump 26 is an RCV288DPL data pump, also available from Rockwell Semiconductor Systems. It will be understood by a person of ordinary skill in the art that the separate components of the invention may be incorporated into a single integrated circuit or chip structure, as suitable.

In accordance with one embodiment of the present invention, a locking device 30 is coupled to controller unit 12 for disabling the Internet capabilities of the modem system 10. The locking device 30 preferably has a LOCKED state and an UNLOCKED state. One suitable locking device is a lock switch which may be changed between the UNLOCKED and LOCKED state using a key. Such a switch is disclosed also in pending parent application, Ser. No. 08/699,622. The lock switch may preferably be accessed through the front face of the computer so that a user does not have to log on to the computer for changing the locking device between the LOCKED and UNLOCKED states. The parent or supervising adult simply removes the key upon locking the device 30. If an external modem is utilized, the lock switch would be positioned on that modem, such as on part of the modem case. In a preferred embodiment of the invention, the LOCKED state and UNLOCKED state of the locking device 30 corresponds to a voltage signal $V^+$ or a ground signal presented to controller unit 12 on line 31. As understood by a person of ordinary skill in the art, the voltage is indicated as positive, but could be either positive or negative. When the switch is LOCKED, one potential ($V^+$ or ground) is presented to controller unit 12; when the switch is UNLOCKED, the other potential is presented to unit 12. The controller unit 12 is appropriately programmed to recognize a particular potential as LOCKED or UNLOCKED, as discussed below. For example, if $V^+$ on line 31 indicates a LOCKED state, then grounded line 31 will indicate an UNLOCKED state, or vice versa.

When the locking device 30 is moved to the LOCKED state, an appropriate lock signal is presented on line 32 to the controller unit 12, such as to a dedicated pin of the controller unit 12. Controller unit 12 provides the necessary control codes to the data pump 26 for controlling the data pump operation. Generally, the codes will be stored in the ROM 22, coupled to the controller unit, although internal memory of controller unit 12 may be utilized. The software for controlling the controller unit 12, such as the source code, is modified so that the operational state of the locking device 30 is checked before the controller unit executes any dialing commands which are received by the controller unit 12 from the computer. Depending upon the controller unit utilized, the necessary source code software will be available from the manufacturer and will be modified to check the state of the locking device and to respond accordingly.

Figure 2:
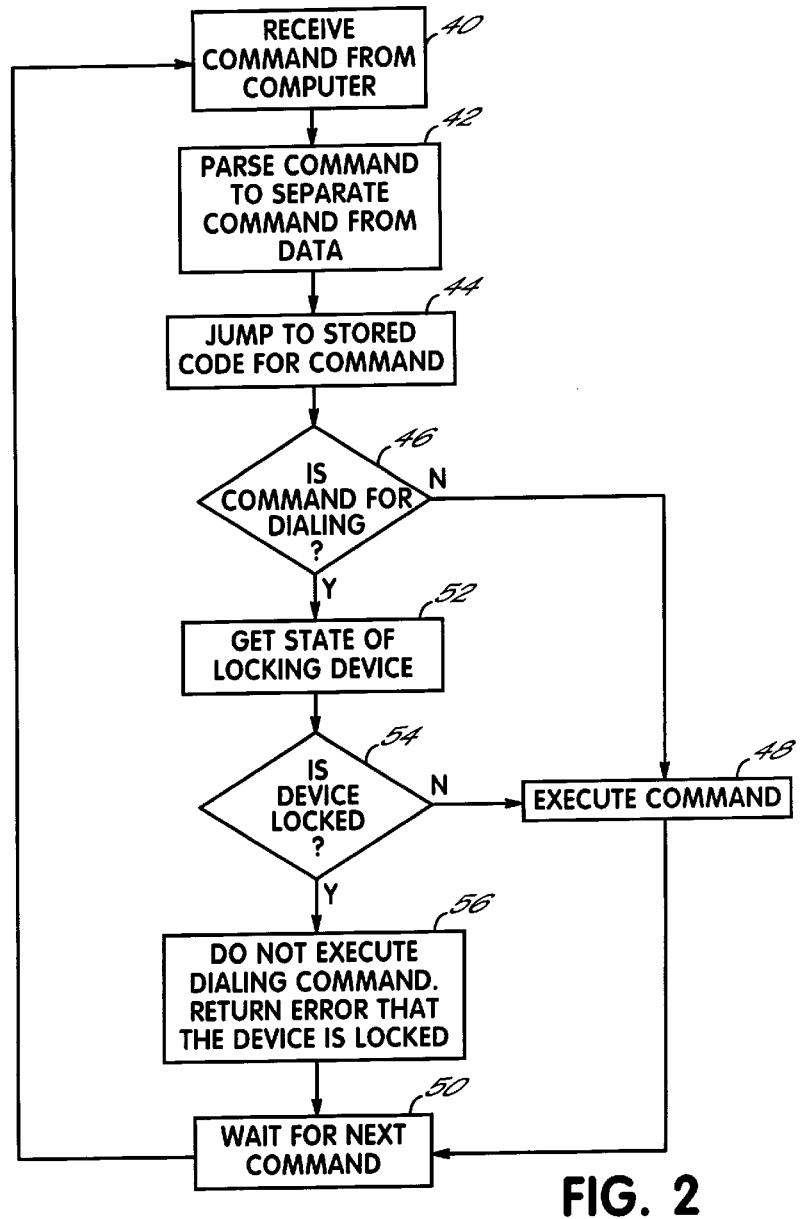
FIG. 2 is a flow chart diagram for operation of the embodiment illustrated in FIG. 1.

Turning now to FIG. 2, the flow chart illustrates one possible operation scenario for the embodiment of the invention disclosed in FIG. 1. The controller unit 12 receives a command, such as a dialing command, from the computer through interface 14 and bus 16. For a Rockwell microcomputer, those commands might be AT Commands. However, it will be understood by a person of ordinary skill in the art that other command schemes might also be utilized for other microcomputers. The command received from the computer (step 40) will determine the operation of the modem system 10.

Next, the controller unit 12 parses the command to separate the command from any data associated therewith (step 42). The jump is then made to stored control codes associated with the received command, such as in ROM 22 (step 44). It will be understood by a person of ordinary skill in the art that the controller unit 12 might also include internal memory which contains the stored control code for the particular command.

The controller unit 12 then determines whether the command from the computer is a command for dialing, such as for accessing the Internet (step 46). If the command is not for dialing, the command is executed (step 48) and electronic information is transmitted or received over telephone lines 29. The command is executed by using the associated control codes to operate data pump 26 for transmitting/receiving electronic information such as data, voice, and facsimile information, and the controller unit then waits for the next command (step 50).

However, if the command is for dialing into the Internet, the controller unit 12 must then determine whether the locking device 30 of the invention is LOCKED. Accordingly, controller unit 12 checks the status or gets the state of the locking device (step 52) on line 31 at the appropriate pin (not shown) of controller unit 12. As discussed, controller 12 may recognize $V^+$ or ground as a LOCKED or UNLOCKED state. If the locking device, such as a locking switch, is not in the LOCKED state, then the system, and specifically the controller unit 12 will know that Internet access is not to be prevented (step 54). Accordingly, the command is executed through the data pump 26 (step 48).

If the locking device is in a LOCKED state, then Internet access is to be prevented, and the controller unit does not execute the dialing command (step 56). Therefore, the control codes for dialing are not sent to the data pump 26. Instead, an error message or code is returned from the controller unit to the computer on bus 16 to indicate that the locking device is LOCKED and that Internet access will be prevented (step 56). The data pump 26 does not send any electronic information, but is capable of receiving such information. Then, controller unit 12 proceeds to wait for the next command. As indicated in FIG. 2, the loop will continue, and the status of the locking device will constantly be checked when a command for dialing into the Internet is presented to the controller unit 12.

In that way, a child's exposure to harmful and undesirable information on the Internet is prevented. An adult may very easily lock the locking device 30, such as by turning a key, and no computer literacy is required by the supervising adult. Furthermore, the incoming fax and voice capabilities of the computer are left intact because the controller unit 12 will only prevent dialing to obtain Internet access. That is, faxes and voice messages may be received, but they will not be able to be sent. However, children generally do not have the need to send faxes and voice messages, and when an adult desires to do so, the locking device can simply be unlocked.

As discussed hereinabove, controller unit 12 will generally be programmed for checking the state of the locking device upon receipt of a dialing command. If a Rockwell L39 or P39 microcomputer is utilized, suitable source code modifications can be readily made by a person of ordinary skill in the art, according to the microcomputer source code, which can be obtained from Rockwell Semiconductor Systems. Of course, other brands of microcomputers might be utilized, having their own particular control protocol, which may be modified by a person of ordinary skill in the art according to the principles of the present invention.

Figure 3:
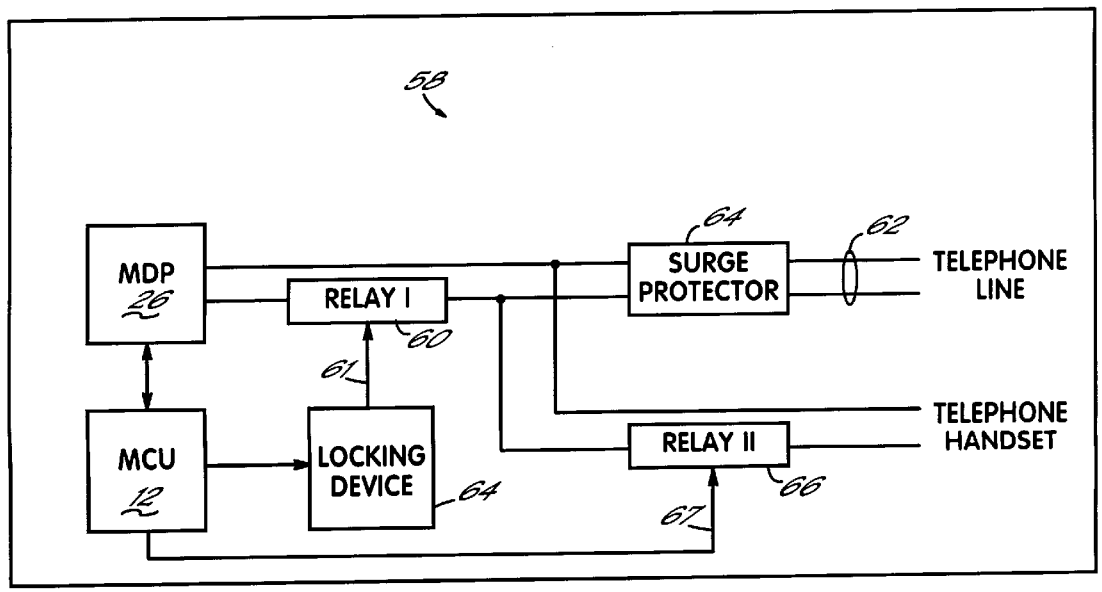
FIG. 3 is a block schematic diagram illustrating another embodiment of the present invention.

FIG. 3 discloses an additional alternative embodiment for practicing the present invention. With respect to system 58, a locking device is coupled between the controller unit 12, and an output relay 60 of the modem circuitry. The controller unit 12 operates a plurality of relays 60, 66 which are usually associated with the telephone line interface circuitry, like circuitry 28 (see FIG. 1). One such relay is connected in line with the data pump 26 and affects the transmission on telephone line 62. Generally, a surge protector 64 will be coupled in line between the data pump 26 and telephone line 62. The relays 60, 66 illustrated in FIG. 3 are generally found in most telephone line interface circuitry of conventional personal computer (PC) modem cards. Controller unit 12 controls relays 60 and 66 through appropriate control lines 61, 67.

Locking device 64 is coupled between controller unit 12 and relay 60, and thus will provide the control signal on line 61. By placing the locking device in a LOCKED state, such as by opening or closing a lock switch, the system 58 is essentially disabled with respect to interfacing to an outside telephone line. Preferably, when the locking device is locked, relay 60 will not transmit any electronic information, and thus the appropriate signals cannot be delivered from data pump 26 to telephone line 62 for ultimate delivery to an outside telephone line. When locking device 64 disables the modem, it disables all functions, including voice functions and facsimile functions, because relay 60 is connected in line with telephone line 62.

Locking device 64 of the embodiment illustrated in FIG. 3 would be somewhat similar to the locking device 30 of the embodiment illustrated in FIG. 1, and will preferably include an inexpensive locking switch which utilizes a key. In that way, a parent or supervising adult can readily and easily prevent Internet access without having to log on the computer or have any formal computer background. Furthermore, the embodiment illustrated in FIG. 3 and discussed above, does not require modification of any control software for controller unit 12. Thus, it will generally be less expensive to implement. Locking device 64 will preferably operate by breaking the control line 61 as necessary to prevent control of relay 60 by controller unit 12. That is, locking device 64 will be either a closed circuit or an open circuit, depending on what is necessary for properly operating relay 60 in the LOCKED and UNLOCKED states. For example, in the LOCKED state, locking device 64 may be open to prevent unit 12 and relay 60 from communicating.

Figure 4:
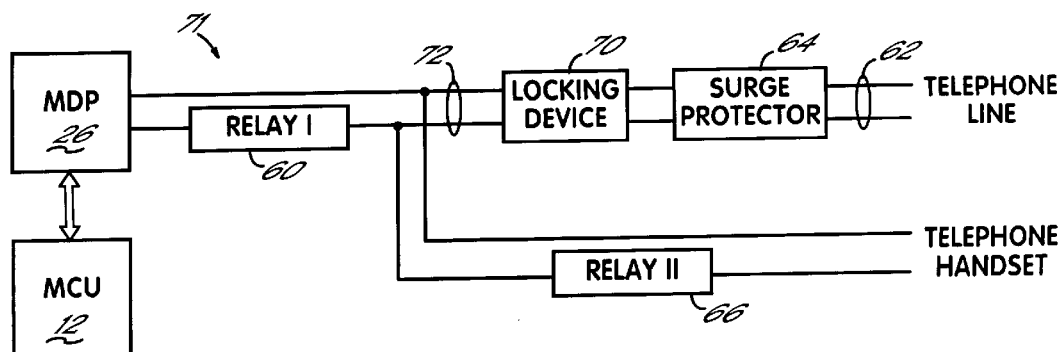
FIG. 4 is a block schematic diagram illustrating another embodiment of the present invention.

FIG. 4 illustrates yet another embodiment of the present invention in which a locking device 70 of system 71 is positioned in line between the data pump 26 and telephone line 62. In such a case, the telephone signal travels through locking device 70. If the locking device 70, such as a locking switch, is in a LOCKED state, the electronic information signals are prevented from being delivered to the circuitry on the output side of locking device 70, such as to surge protector 64 and the internal modem telephone line 62. Accordingly, all output from the modem system 58 is prevented. Preferably, the connecting lines 72 and the locking device 70 will be appropriately shielded to prevent degradation of the telephone signal. Generally, the locking device 70 comes with a lock switch which will be fixed to the front panel of the computer for immediate access. Accordingly, the telephone signal on line 72 will be traveling through the computer where it is susceptible to picking up noise. Therefore, shielding the line 72 and locking device 70 may be desirable for noise reduction.

Locking device 70 may be like locking device 64 and opened or closed as necessary for the LOCKED and UNLOCKED states. The locking device 70 may also be used in conjunction with several lines, as shown in FIG. 4, or with a single line, as necessary, for preventing Internet access in accordance with the principles of the present invention.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

What is claimed is:

1. A lockout system for preventing children from accessing parentally-restricted and undesirable material with a computer comprising:

a controller unit operable for receiving commands from a computer and generating control codes responsive to said commands;

a data device coupled to said controller unit and operable for transmitting electronic information over a line, the data device transmitting electronic information in response to said control codes;

a locking device including a key operated lock switch operably coupled to said controller unit, the lock switch being switchable, with a key, between a LOCKED state and an UNLOCKED state;

the controller unit further operable for determining the state of said lock switch and preventing the transmission of electronic information from said data device when the lock switch is in a LOCKED state;

whereby the transmission of electronic information for the purposes of accessing parentally-restricted material is prevented.

2. The lockout system of claim 1 wherein the controller unit comprises a microcomputer.

3. The lockout system of claim 1 wherein the controller unit is operable for generating dialing control codes for said data device upon the receipt of a dialing command from a computer.

4. The lockout system of claim 3 wherein said controller unit is further operable for preventing the generation of said dialing control codes when the lock switch is in the LOCKED state.

5. A lockout system for preventing children from accessing parentally-restricted and undesirable material with a computer comprising;

a controller unit operable for receiving commands from a computer and generating control codes responsive to said commands;

a data device coupled to said controller unit and operable for transmitting electronic information over a line, the data device transmitting electronic information in response to said control codes;

a relay device positioned in-line with said data line of the data device, the controller unit operably coupled to said relay device for operating said relay device for transmitting electronic information over said line;

a locking device including a key operated lock switch operably coupled between said controller unit and said relay device, the lock switch being switchable with a key between a LOCKED state and an UNLOCKED state, the lock switch, when in the LOCKED state, operable for preventing the controller device from operating the relay device for transmitting electronic information;

whereby the transmission of electronic information for the purposes of accessing parentally-restricted material is prevented.

6. A lockout system for preventing children from accessing parentally-restricted and undesirable material with a computer comprising:

a controller unit operable for receiving commands from a computer and generating control codes responsive to said commands;

a data device coupled to said controller unit and operable for transmitting electronic information over a line, the data device transmitting electronic information in response to said control codes;

a locking device operably coupled in-line with said line, the locking device including a key operated lock switch which is switchable, with a key, between a LOCKED state and an UNLOCKED state, the lock switch being operable, in the LOCKED state, for preventing the transmission of the electronic information;

whereby the transmission of electronic information for the purposes of accessing parentally-restricted material is prevented.

* * * * *